(12) United States Patent
Boland

(10) Patent No.: US 7,043,014 B2
(45) Date of Patent: May 9, 2006

(54) APPARATUS AND METHOD FOR TIME-ALIGNMENT OF TWO SIGNALS

(75) Inventor: Simon Daniel Boland, Pennant Hills (AU)

(73) Assignee: Avaya Technology Corp., Basking Ridge, NJ (US)

(*) Notice: Subject to any disclaimer, the term of this patent is extended or adjusted under 35 U.S.C. 154(b) by 299 days.

(21) Appl. No.: 10/152,716

(22) Filed: May 22, 2002

(65) Prior Publication Data
US 2003/0219087 A1   Nov. 27, 2003

(51) Int. Cl.
*H04M 9/08* (2006.01)
(52) U.S. Cl. .............................. 379/406.1; 379/406.03; 379/406.01
(58) Field of Classification Search ........... 379/406.01, 379/406.02, 406.04, 406.06, 406.08, 406.1, 379/406.03
See application file for complete search history.

(56) References Cited
U.S. PATENT DOCUMENTS
3,784,747 A * 1/1974 Berkley et al. ........ 379/406.14
5,737,410 A * 4/1998 Vahatalo et al. ....... 379/406.08
5,933,808 A * 8/1999 Kang et al. .................. 704/278

OTHER PUBLICATIONS

Draft New Recommendation P.862: Perceptual Evaluation of Speech Quality (PESQ), An Objective Method For End-To-End Speech Quality Assessment of Narrow-Band Telephone Networks And Speech CODECS, COM 12-5-E, ITU Telecommunication Standard Sector, Nov. 2000.
PESQ—the new ITU standard for end-to-end speech quality assessment, A.W. Rix, et al., AES 109th Convention Los Angeles, 200 Sep. 22-25, pp. 1-18.
The Perceptual Analysis Measurement System For Robust End-To-End Speech Quality Assessment, A.W. Rix, et al., IEEE, 2000, pp. 1515-1518.

* cited by examiner

*Primary Examiner*—Jefferey F. Harold
(74) *Attorney, Agent, or Firm*—John C. Moran

(57) ABSTRACT

A recently received portion of a transmit signal is utilized, and a pitch period of the received signal is determined. Then, the determined pitch period is utilized to search for similarities in the originally transmitted signal. This searching is done over a range of delays. Once the optimal delay is determined, it is then utilized as the delay between the transmitted signal and the received signal. Once this delay is known, the received signal can be time-aligned with the delayed signal.

22 Claims, 4 Drawing Sheets

APPARATUS AND METHOD FOR TIME-ALIGNMENT OF TWO SIGNALS

TECHNICAL FIELD

This invention relates to the transmission of digitally encoded voice, and in particular, to the alignment of digital voice signals.

BACKGROUND OF THE INVENTION

In the transmission of digitally encoded voice, it is often important to be able to time-align the originally transmitted encoded voice information (also referred to as a transmitted signal) with the received encoded voice information (also referred to as a received signal) after received voice information has been transported through a switching network. The switching network can be a traditional circuit switch network or a packet switching network such as ATM, frame relay, or Internet switching. One use for the time alignment of the original digitally encoded voice with the received digital encoded voice is in order to perform speech quality assessment. Until recently the only way to measure users' perception of the quality of voice transmission systems was to conduct subjective tests utilizing humans to make testing judgments. However, subjective tests are expensive and slow, can not be used in certain applications such as in-service monitoring. Various objective models, based on human perception, were therefore developed with the aim of predicting the results of human subjective tests. Various algorithms have been proposed to assess the perception of the quality of transmitted digital voice. The most promising of these algorithms is the perceptual evaluation of speech quality (PESQ). This algorithm has become the basis for the International Telecommunication Union (ITU-T) standard P862. This new standard requires the time alignment of a received digitally encoded voice with a transmitted digitally encoded voice. The method for performing the time alignment of the two voice signals proposed in this standard uses a complicated splitting of speech utterances within the overall speech signal to perform re-alignment of incorrectly aligned samples. Such a technique would result in a complex and expensive alignment algorithm.

SUMMARY OF THE INVENTION

This invention is directed to an apparatus and method that solves the problems and disadvantages of the prior art. A recently received portion of a transmit signal is utilized and a pitch period of a received signal is determined. Then, the determined pitch period is utilized to search for similarities in periods of the originally transmitted signal. This searching is done over a range of delays. Once the optimal delay is determined, it is then utilized as the delay between the transmitted signal and the received signal. Once this delay is known, the received signal can be time-aligned with the delayed signal.

DETAILED DESCRIPTION

Figure 1:
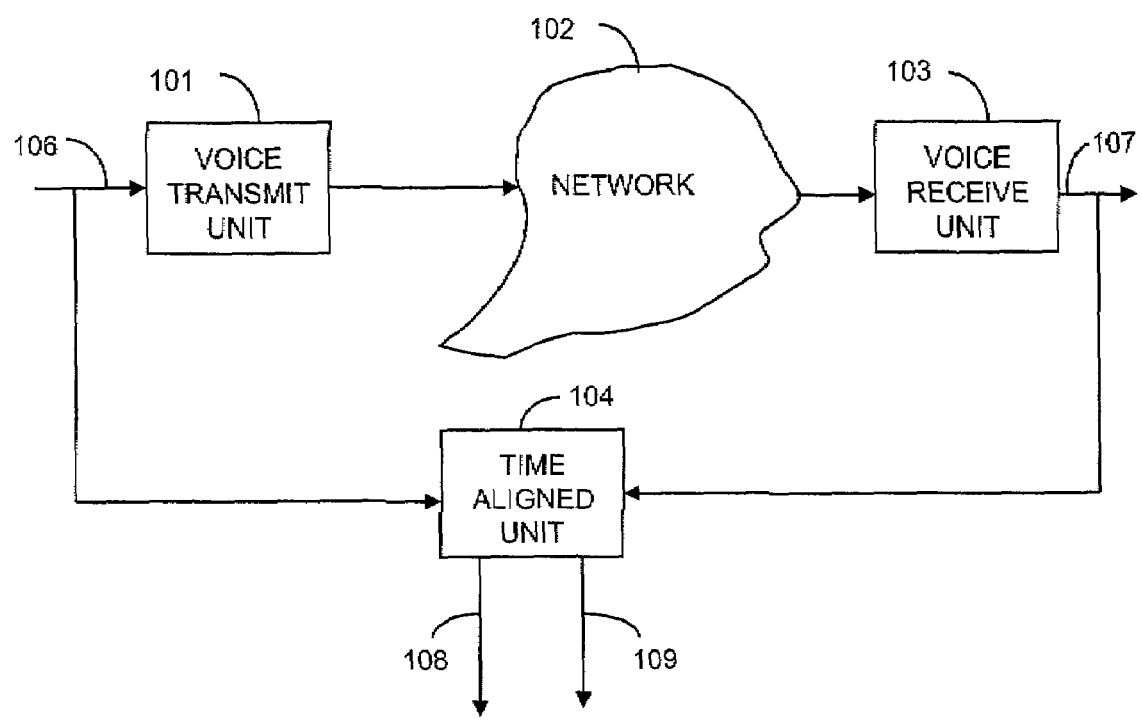
FIG. 1 illustrates an embodiment of the invention.

FIG. 1 illustrates a system whereby a voice signal (digital encoded information) is used as input to voice transmit unit 101 and transported via network 102 and voice receive unit 103 to output 107. Time aligned unit 104 is responsive to input signal 106 and the signal of output 107 to produce output 108 which is input signal 106 time shifted with respect to the transmission delay to match output signal 107. This time shifted signal of input signal 106 is transmitted from output 108. In addition, time aligned unit 104 produces output 109 that designates the amount of delay between input signal 106 and output signal 107.

Figure 2:
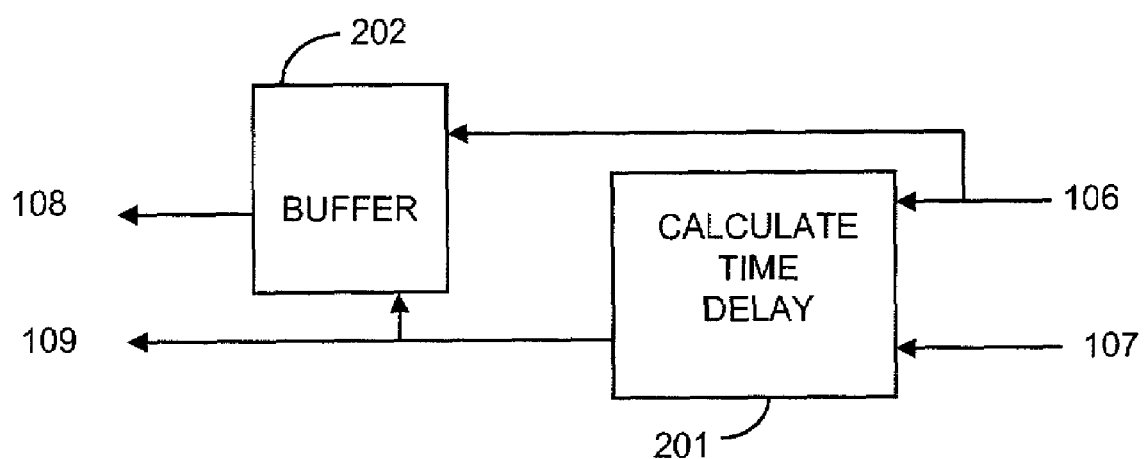
FIG. 2 illustrates an embodiment of a time-alignment unit.

FIG. 2 illustrates time-alignment unit 104 in greater detail. Block 201 calculates the time delay between the transmitted signal 106 and the received signal 107. Block 201 is also referred to as a time delay calculator. Greater details on how this time delay is calculated are given with respect to FIG. 3. Block 201 outputs the calculated time delay via output 109. Buffer 202 which buffers transmitted output 106 utilizes the calculated time delay to determine what portion of buffer 202 matches the present received signal 107. The output of buffer 202 is transmitted on output 108. As previously noted, quality assessment equipment utilizes the signal of output 108 and the input signal to input 106 to determine the perceptual quality of the transmission of units 101 and 103 and network 102.

As is well known to one skilled in the art, output 107 will output a signal that is a distorted version of the input/transmitted signal 106. Not only is output 107 time delayed from signal 106 but distortion is also introduced by elements 101–103. Primarily, it is this distortion that is to be analyzed by a perceptual speech assessment unit utilizing outputs 107 and 108.

Figure 3:
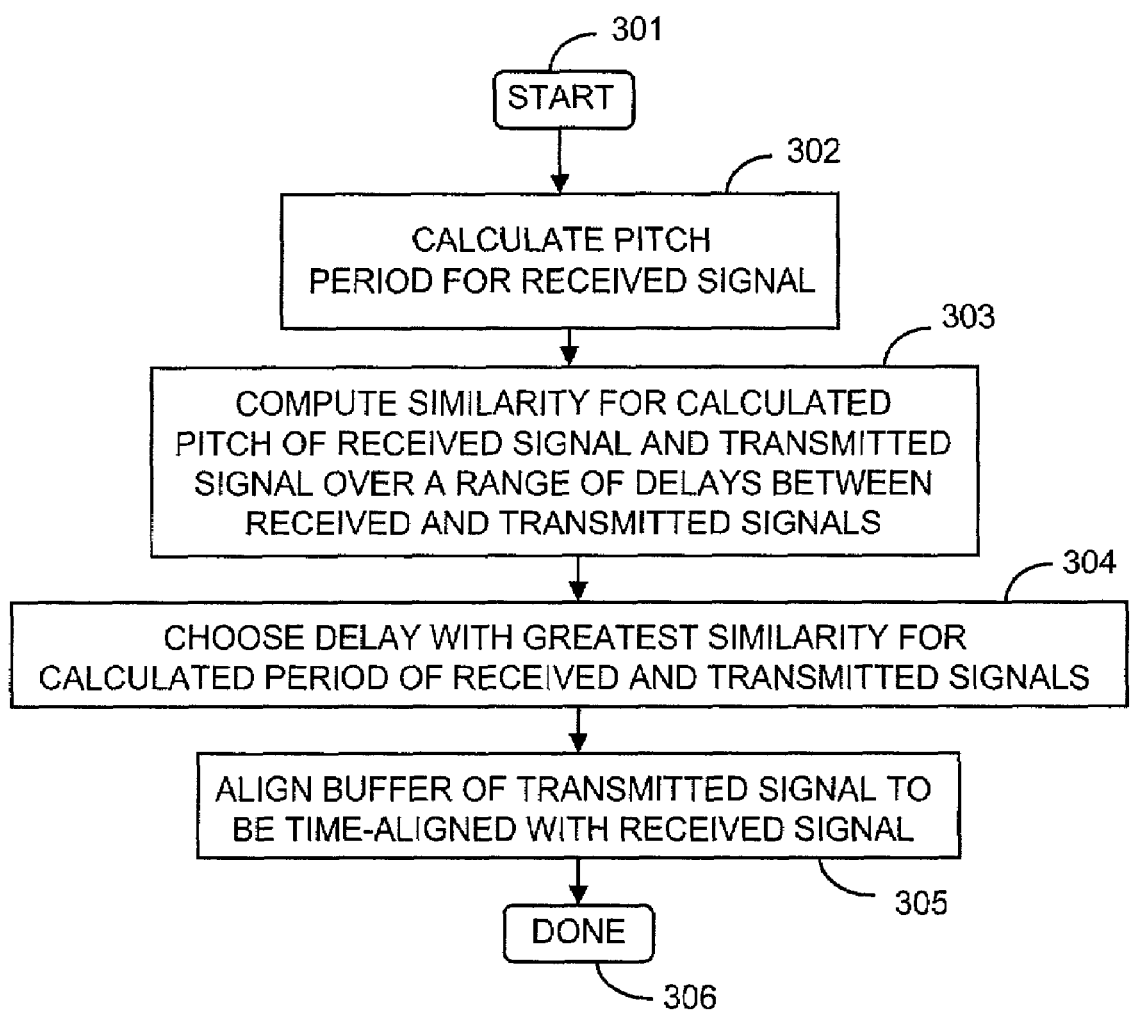
FIG. 3 illustrates, in flowchart form, an embodiment of the invention.

FIG. 3 illustrates, in flowchart form, steps performed in implementing an embodiment of the invention. FIG. 3 illustrates the operation of an embodiment of blocks 201 and 202 of FIG. 2. Once started from block 301, block 302 calculates the pitch period for a buffer of samples of the received signal outputted from block 103 of FIG. 1. Next, block 303 utilizes this calculated pitch period to compute the similarities between the transmitted signal and the received signal over a range of delays. For each particular delay, the similarity is determined. Once the similarities have been determined for each delay within the range of delays, block 304 chooses the delay that produces the greatest similarity for the calculated period within the received and transmitted signals.

Block 305 then utilizes this chosen delay to control buffer 202 of FIG. 2 so that the output 108 is properly aligned with the received signal. Block 306 indicates that the operations are completed.

Consider now in greater detail the operations performed by block 302 of FIG. 3 in calculating the pitch period for the received signal. The assumption is made that for human speech sampled at 8 kHz that the possible range of pitch period values, T, range from a minimum, $T_{min}$, of 19 samples, to a maximum, $T_{max}$, of 140 samples. Within this range of possible pitch periods, T, a score S(T) is calculated for each possible pitch period by the following calculation:

$$S(T) = \frac{1}{T} \sum_{n=0}^{T} |x[n] - x[n-T]| \qquad \text{Equation 1}$$

This equation sums the absolute difference between samples from a current period and the previous period for a range of T samples and then divides the result by T. The optimal calculated period, $T_{opt}$, is found by taking the computed values for S(T) and finding the value of T which gives the minimum S(T). This value of T is designated $T_{opt}$.

Consider now in greater detail the operations performed by block 303 in one embodiment of the invention. The operations of block 303 are illustrated in the following two equations:

$$A[d] = \frac{\sum_{n=0}^{T_{opt}} [x[n-d]y[n]]}{\sum_{n=0}^{T_{opt}} [x[n-d]]^2} \quad \text{Equation 2}$$

$$P[d] = \frac{\sum_{n=0}^{T_{opt}} [y[n] - A[d]x[n-d]]}{\sum_{n=0}^{T_{opt}} [y[n]]^2} \quad \text{Equation 3}$$

These equations are calculated for a range of delays from $D_{min}$ to $D_{max}$. The two equations calculate a value that is essentially the periodicity between the transmitted and received signals. The first of these two equations, equation 2, calculates a value, A[d], for each of the delays within the range. Each of these values of A is then utilized to calculate values, P[d], for each of the delays over the range of delays by repeatly calculating equation 3. To determine the optimal delay, $D_{opt}$, the following equation is calculated:

$$D_{opt} = \min\{P[d]\} \quad \text{Equation 4}$$

$D_{opt}$ is equal to the delay whose value, P, is the smallest. Equation 4 implements block 304 of FIG. 3. Block 202 of FIG. 2 is then responsive to the value, $D_{opt}$, to align the transmitted signal with the received signal.

Figure 4:
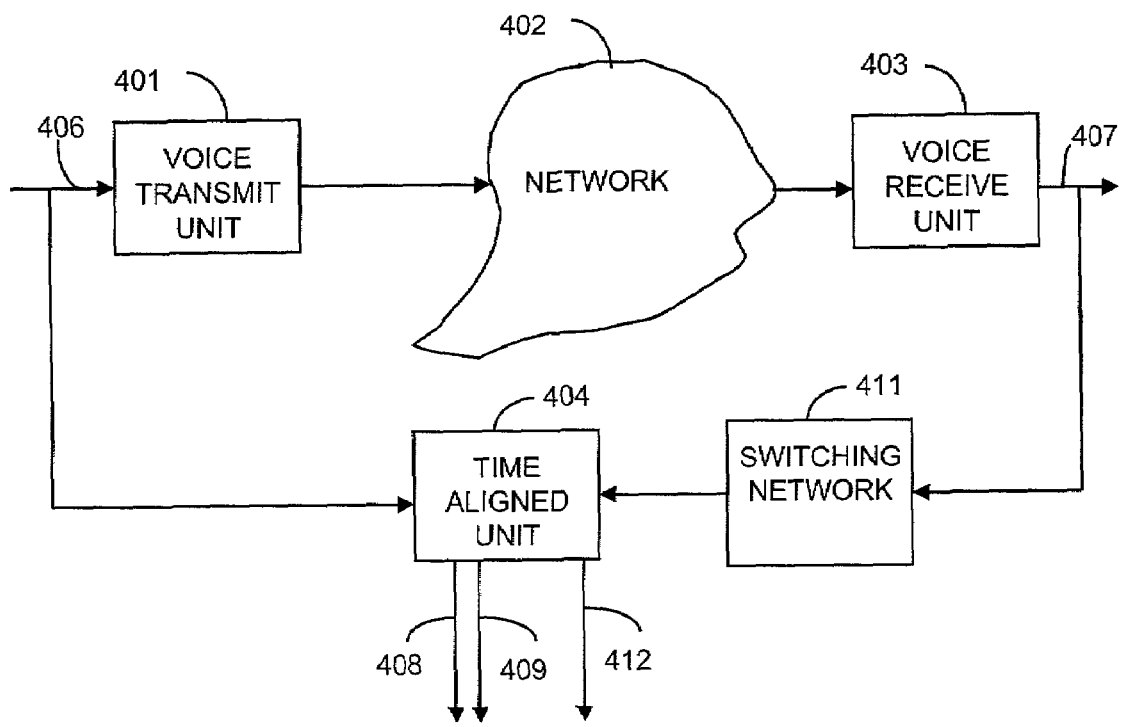
FIG. 4 illustrates another embodiment of the invention.

FIG. 4 is another embodiment of the invention. Elements 401–403 and elements 407–409 are identical in function to elements 101–103 and elements 107–109. Switching network 411 has a delay with no variation or a small variation in delay and known distortion characteristics. One such switching network is a circuit switched network as it well known to those skilled in the art. By switching the output 407 back to time align unit 404 via switching network 411, it is possible to determine the time-shift between input 406 and output 407 when elements 401 are separated by a great distance. Time aligned unit 404 functions the same manner as time aligned unit 104 except that output 412 indicates the delay time through elements 401–403 and output 408 indicates the delay time through elements 401–403 and element 411.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for determining time alignment between two signals, comprising the steps of:
   transmitting a second signal through a switching network;
   receiving the transmitted second signal and designating the transmitted second signal as a first signal;
   transmitting the first signal through a second switching network; calculating a pitch period in the transmitted first signal
   comparing the calculated pitch period with the second signal to determine an occurrence of the calculated pitch period in the second signal;
   determining a delay between first and second signals; and
   aligning the first and second signals using the determined delay.

2. The method of claim 1 wherein delay and distortion of the second switching network are known.

3. The method of claim 1 wherein the second switching network is a circuit switching network.

4. The method of claim 1 wherein the step of comparing comprises the steps of computing similarities between the pitch period of the first signal and the second signal; and
   using the highest similarity to determine the delay.

5. The method of claim 4 wherein the step of computing is performed over a range of delays.

6. The method of claim 1 wherein the step of aligning comprises the steps of buffering the second signal; and
   controlling the step of buffering with the delay to align the first and second signals.

7. The method of claim 6 wherein the second signal is transmitted and the first signal is the transmitted second signal.

8. The method of claim 7 wherein the step of comparing comprises the steps of computing similarities between the pitch period of the first signal and the second signal; and
   using the highest similarity to determine the delay.

9. The method of claim 8 wherein the step of computing is performed over a range of delays.

10. The method of claim 1 wherein the step of comparing comprises the steps of computing similarities between the pitch period of the first signal and the second signal; and
    using the highest similarity to determine the delay.

11. The method of claim 10 wherein the step of computing is performed over a range of delays.

12. The method of claim 10 wherein the step of aligning comprises the steps of buffering the second signal; and
    controlling the step of buffering with the delay to align the first and second signals.

13. An apparatus for time aligning a signal transmitted through a switching network with the signal received from the switching network, comprising:
    a transmitter for transmitting the signal;
    the switching network communicating the transmitted signal;
    a receiver for receiving the transmitted signal from the switching network;
    a second switching network and the receiver communicating the received signal to a time delay calculator via the second switching network
    the time delay calculator responsive to the received signal for determining a pitch period in the received signal and comparing the calculated pitch period with the signal to determine a delay between the signal and the received signal;
    a buffer for storing the signal; and
    the buffer responsive to the determined delay to time align the signal with the received signal.

14. The apparatus of claim 13 wherein time delay calculator further performs the comparison by computing similarities between the pitch period of the received signal and the signal and using the highest similarity to determine the delay.

15. The method of claim 14 wherein the computing is performed over a range of delays.

16. The apparatus of claim 13 wherein delay and distortion of the second switching network are known.

17. The apparatus of claim 16 wherein the buffer uses the delay of the second switching network to time align the signal and received signal.

18. The apparatus of claim 13 wherein the second switching network is a circuit switching network.

19. The apparatus of claim 13 wherein the time delay calculator outputs the delay.

20. An apparatus for determining time delay between a signal and a received signal, comprising:
    means for transmitting the signal;
    a first switching system for communicating the transmitted signal to a means for receiving the signal;
    the means for receiving further transmitting the received signal to a means for calculating via a second switching network,
    the means for calculating a pitch period in the received signal; and
    means for searching the signal with the pitch period to determine the time delay.

21. The apparatus of claim 20 further comprises means for buffering the signal; and
    means responsive to the time delay for aligning the buffered signal with the received signal.

22. The apparatus of claim 20 wherein the second switching network is a circuit switching network.

* * * * *